(12) United States Patent
Larijani et al.

(10) Patent No.: US 6,603,746 B1
(45) Date of Patent: Aug. 5, 2003

(54) METHOD AND APPARATUS FOR CONTROLLING TRANSMITTED POWER IN A WIRELESS COMMUNICATIONS SYSTEM

(75) Inventors: Parsya R. Larijani, Ottawa (CA); Nimal G. Senarath, Nepean (CA); Adnan Abu-Dayya, Redmond, WA (US)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/335,745

(22) Filed: Jun. 18, 1999

(51) Int. Cl.[7] ................................................. H04J 3/16
(52) U.S. Cl. ......................... 370/318; 370/329; 455/69
(58) Field of Search ............................... 455/522, 422, 455/69, 68, 70; 370/318, 329

(56) References Cited

U.S. PATENT DOCUMENTS 5,278,992 A * 1/1994 Su et al. ...................... 455/69

* cited by examiner

Primary Examiner—Thanh Cong Le

(57) ABSTRACT

A method, apparatus and computer-readable storage medium for use in a communications system wherein the transmit power of a wireless link is adjusted so that link performance meets a target level. The method consists of dynamically adjusting the target level as a function of the traffic characteristics of the link. It may be executed at a base station or mobile unit. To perform the method, the apparatus or storage medium (a) computes a threshold instantaneous performance parameter as a first function of a measured instantaneous performance parameter, a measured instantaneous bit rate and at least one target error performance parameter; and (b) generates a power control command based upon a second function of the measured instantaneous performance parameter and the threshold instantaneous performance parameter. This provides a smoothing effect of the interference induced to other users and may result in increased cell capacity.

19 Claims, 3 Drawing Sheets

METHOD AND APPARATUS FOR CONTROLLING TRANSMITTED POWER IN A WIRELESS COMMUNICATIONS SYSTEM

FIELD OF INVENTION

The present invention relates to wireless communication systems in general and, more particularly, to an improved method and apparatus for controlling the power of signals transmitted by base stations and mobile units operating in a CDMA communications system.

BACKGROUND OF THE INVENTION

Many wireless communications systems in use today employ a form of spread-spectrum communications technology known as code-division multiple-access, or simply "CDMA". In systems utilizing spread spectrum communications technology such as CDMA, signals transmitted by a base station or mobile unit are spread out over a very wide frequency range using pseudo-random noise sequences, making the signals relatively immune to frequency-dependent interference.

The majority of wireless communications systems using CDMA are based on TIA/EIA standard IS-95, which is incorporated by reference herein. IS-95 is known in the industry as a second generation standard. It is anticipated that there will soon be a new industry-wide CDMA standard emerging from various proposals currently under consideration by the International Telecommunications Union (ITU). Such proposals are collectively known as third generation (3G) CDMA proposals and include "cdma2000 RTT Candidate Submission to ITU-R", which is incorporated by reference herein.

In any CDMA system, the mobile units in a given cell act as geographically disparate signal sources which activate at random times. Consequently, it is not possible to synchronize reverse-link transmissions, i.e., transmission from the various mobile units to the cell's base station. It is therefore impossible for a base station to perform accurate detection (even using pilot-assisted coherent reception as in 3G CDMA) without relying on a feedback mechanism to adjust the transmit power of each mobile unit. As a result, a dynamic method of power control known as closed-loop power control is commonly employed for controlling reverse-link power.

On the other hand, forward-link CDMA signals transmitted by a base station and destined for the various mobile units in the cell are designed to be mutually orthogonal and, furthermore, transmission of these signals can be synchronized by the base station. Thus, not only is a transmitted CDMA signal destined for a given mobile unit immune to interference from signals destined for other mobile units, but the mobile unit is able to perform coherent detection with a large processing gain. Accordingly, second generation standards such as IS-95 do not provide for closed-loop power control in the forward-link direction. Nevertheless, it has been found from experience with IS-95 CDMA that significant additional performance improvements can be achieved by using a feedback power control mechanism as in the reverse-link. Accordingly, most 3G CDMA proposals call for the use of closed-loop power control.

Closed-loop power control consists of a destination (which could be a base station or a mobile unit) measuring the signal-to-interference ratio of a signal received from a source and comparing the measured signal-to-interference ratio with a predetermined target value. If the measured value is greater than the target value, then the power transmitted by the source may be lowered, while if it is less than the target value, then the power transmitted by the source must be increased in order to meet the target. The desired power adjustment is forwarded by the destination back to the source along an appropriate power control subchannel.

A separate outer-loop power control mechanism is responsible for setting the target signal-to-interference ratio. The guidelines for implementing open-loop power control in the forward-link (3G CDMA) and the reverse-link (IS-95 and 3G CDMA) directions are fairly flexible. Still, thus far, designers have chosen to constrain the target signal-to-interference ratio to a constant value or one which depends on the type of service being offered. While this is satisfactory for situations where the data rate of a service is generally constant and quite low, many emerging applications require high data rates (certain 3G CDMA proposals anticipate that data connections at rates of up to 2 megabits per second per connection should be supported) and are characterized as having a substantially bursty traffic pattern.

As a result, if a conventional closed-loop power control algorithm relying on a fixed or service-specific target signal-to-interference ratio is applied in, say, the reverse-link direction, then whenever there is an increase in the instantaneous traffic from a given mobile unit, all the other mobile units will be required to raise their transmit power significantly because of interference from the given mobile unit. The fact that the other mobile units have raised their transmit power causes interference to the given mobile unit, which is again forced to increase its transmit power, and so on. This phenomenon will be repeated at a time scale of the burst duration which makes it a frequently occurring event.

Frequent increases in transmit power may cause undue stress on the transmitter power amplifier, which may consequently limit the cell capacity. Furthermore, the power control algorithm is required to converge quickly in order to avoid outages during the bit rate transition from a low bit rate to a high bit rate.

Similar effects occur in the forward-link direction, although other mobile units within the same cell as the given mobile unit are relatively immune to interference caused by forward-link transmissions involving the given mobile unit. Still, the above described effects can occur as a result of bursty forward-link transmissions occurring in neighbouring cells.

Clearly, the signal-to-interference ratio alone does not appear to be an adequate characterization of the grade of service required of a bursty link. For instance, when the mobile unit is transmitting at a high bit rate, its required performance and required quality of service are likely different from when the bit rate is considerably lower. Thus, there is a need in the industry to provide a method and apparatus for controlling transmitted power by a base station or mobile unit which takes into account the bursty nature of data traffic.

SUMMARY OF THE INVENTION

The invention can be summarized according to a first broad aspect as a method for use in a communications system wherein the transmit power of a wireless link is adjusted so that link performance meets a target level, the method including dynamically adjusting the target level as a function of the traffic characteristics of the link.

The invention can be summarized according to a second broad aspect as a method for use in a closed-loop power control system wherein the transmit power of a source unit communicating with a destination unit across a wireless link is varied in accordance with measured performance and a target performance parameter. The method is one of setting the target performance parameter and is performed at the destination unit. The method includes (a) detecting the start and end of data bursts received from the source unit across the link; and (b) if the performance of the link is adequate, then gradually increasing the target performance parameter when the start of a burst is detected and gradually decreasing the target performance parameter when the end of a burst is detected.

According to another broad aspect, the invention can be summarized as a method of generating power control commands for transmission to a source unit communicating with a destination unit. The method includes (a) measuring an instantaneous performance parameter of signals received from the source unit; (b) determining an instantaneous bit rate, denoted $R^M_{INST}$, of the signals received from the source unit; (c) computing a threshold instantaneous performance parameter as a first function of the measured instantaneous performance parameter, of $R^M_{INST}$, and of at least one target error performance-parameter; and (d) generating a power control command based upon a second function of the measured instantaneous performance parameter and the threshold instantaneous performance parameter.

Preferably, the measured instantaneous performance parameter is a measured instantaneous signal-to-interference ratio, denoted $(S/I)^M_{INST}$, and the threshold instantaneous performance parameter is a threshold instantaneous signal-to-interference ratio, denoted $(S/I)^L_{INST}$. Preferably, two of the target error performance parameters are a target average signal-to-interference ratio, denoted $(S/I)^*_{AVG}$, and a target maximum outage time, denoted $T^*_{MAX}$.

Preferably, step (c) includes (c1) integrating $(S/I)^M_{INST}$ over a first time window to compute a measured average signal-to-interference ratio, denoted $(S/I)^M_{AVG}$; (c2) integrating $R^M_{INST}$ over a second time window to compute an average bit rate, denoted $R^M_{AVG}$; and (c3) among a plurality of most recent values of $(S/I)^M_{INST}$, determining the longest amount of time during which $(S/I)^M_{INST}$ was below $(S/I)^*_{AVG}$, said longest amount of time being denoted $T^M_{MAX}$.

Preferably, the first function is:

$$\left(\frac{S}{I}\right)^L_{INST} = \left(\frac{S}{I}\right)^*_{AVG} \cdot \alpha, \text{ where}$$

$$\alpha = \begin{cases} 1, & \text{if } T^M_{MAX} > T^*_{MAX} \text{ or } \left(\frac{S}{I}\right)^M_{AVG} < \left(\frac{S}{I}\right)^*_{AVG} \\ \dfrac{R^M_{AVG}}{R^M_{INST}}, & \text{otherwise.} \end{cases}$$

The invention can be summarized according to another broad aspect as a computer-readable storage medium which, when processed by a computer at a destination unit, executes a sequence of steps to generate a power control command for transmission to a source unit communicating with the destination unit. The steps include (a) computing a threshold instantaneous performance parameter as a first function of a measured instantaneous performance parameter, a measured instantaneous bit rate and at least one target error performance parameter; and (b) generating a power control command based upon a second function of the measured instantaneous performance parameter and the threshold instantaneous performance parameter.

According to still another broad aspect, the invention may be summarized as a statistical power control block for use in a destination unit communicating with at least one source unit. The statistical power control block includes a unit for computing a threshold instantaneous performance parameter as a first function of a measured instantaneous performance parameter, a measured instantaneous bit rate and at least one target error performance parameter; and a unit connected to the computing means, for generating a power control command based upon a second function of the measured instantaneous performance parameter and the threshold instantaneous performance parameter.

The invention can also be summarized as a functional unit for generating power control commands. The functional unit includes a maximum selector for receiving a plurality of composite correlation levels and selecting the largest thereamong, as well as an integrator connected to the maximum selector, for receiving the largest composite correlation level and integrating it over a predetermined length of time, thereby to produce a measured instantaneous performance parameter at regular intervals. In addition, the functional unit includes the above-described statistical power control block.

When the invention is implemented, a sudden burst of data results in a lowering of the threshold instantaneous signal-to-interference ratio, until such time that the average signal-to-interference ratio or the maximum outage time are no longer acceptable. This provides a smoothing effect of the interference induced to other users and there may result an increase in cell capacity. Similarly, if the data rate is reduced while the limitations on the average error performance and outage times are being respected, then the average bit rate will be higher than the instantaneous bit rate, which increases the threshold instantaneous signal-to-interference ratio, which further maintains the mobile unit's transmitted power at a relatively high power level for a longer time interval, followed by a gradual reduction as the average bit rate drops with time.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENT

The invention is applicable to a wireless communications system in which the transmit power of individual wireless links is adjusted so that link performance meets a target level. The term "transmit power" can refer to the transmit power of a mobile unit or a base station. The target level is adjusted by way of an outer-loop power control mechanism. In accordance with the present invention, the target level is dynamically adjusted as a function of the traffic characteristics (e.g., burstiness) of the link.

Figure 1:
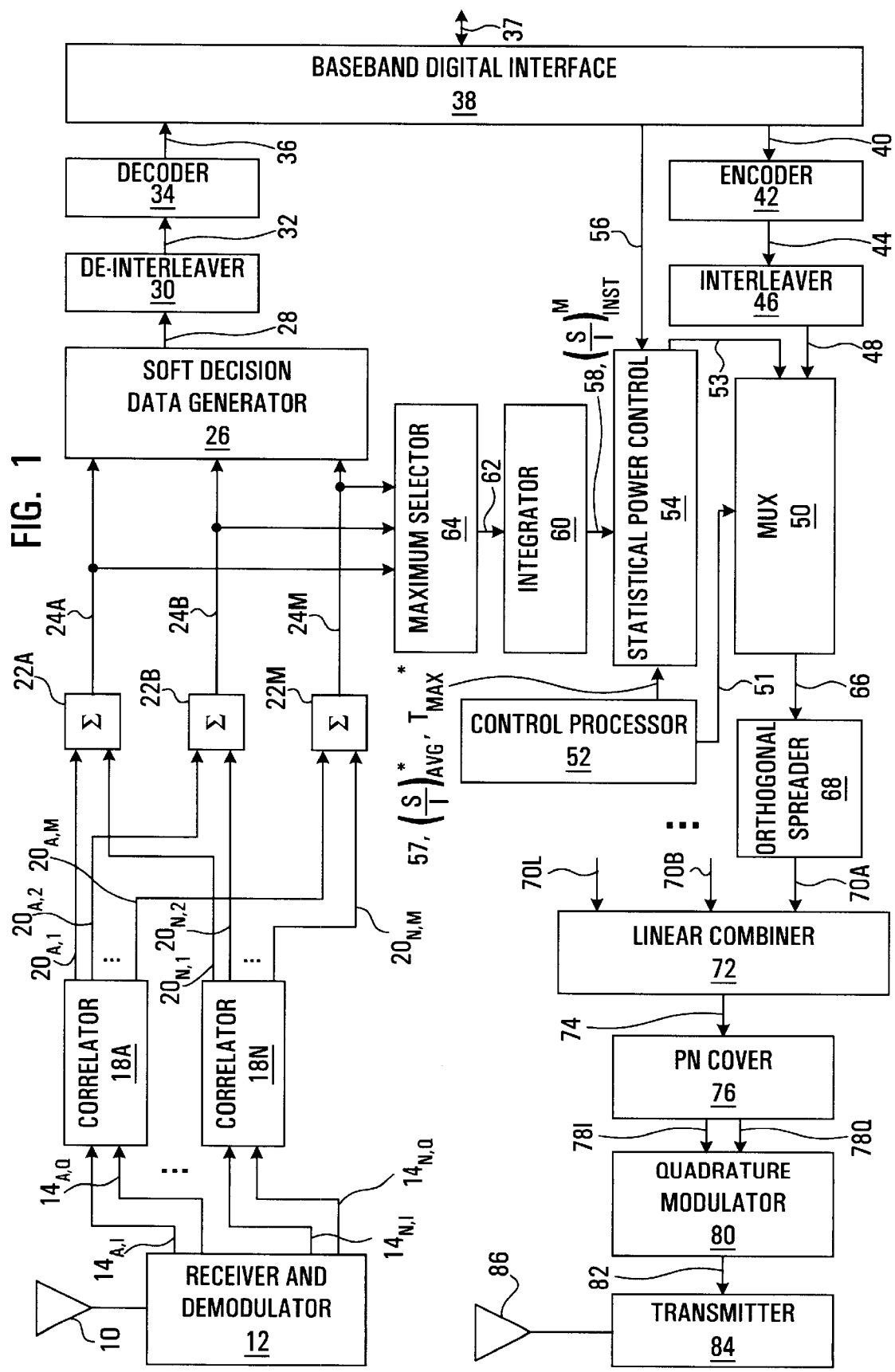
FIG. 1 is a block diagram of a base station utilizing a power control mechanism according to the preferred embodiment of the present invention.

With reference to FIG. 1, there is shown a block diagram of a base station for communicating with a plurality of mobile units in a CDMA communications system. The base station is equipped with an outer-loop power control mechanism designed according to the preferred embodiment of the present invention. The base station comprises an antenna 10 connected to a receiver/demodulator 12. The antenna 10 receives radio frequency signals from the mobile units with which the base station communicates. The received radio frequency signals are subject to multipath interference due to the propagation conditions existing between the mobile units and the base station.

For each mobile unit, the receiver/demodulator 12 receives the respective radio frequency signal from the antenna 10 and tracks N (typically two or three but possibly more) of the strongest multipath paths present in the received signal. This is achieved by a process familiar to those skilled in the art and essentially consists of despreading the received signal with known spreading codes at each of N distinct multipath delays. The delays are identified by a searcher receiver located within the receiver/demodulator 12.

It is also typical for the receiver/demodulator 12 to apply quadrature dispreading of the signal associated with each multipath delay using an in-phase spreading code and a quadrature-phase spreading code, resulting in N pairs of despread quadrature data streams for each mobile unit. FIG. 1 show N despread in-phase data streams $14_{A,I} \ldots 14_{N,I}$ and N corresponding despread quadrature data streams $14_{A,Q}, \ldots, 14_{N,Q}$ associated with a given one of the mobile units . It should be understood that the receiver/demodulator 12 provides N pairs of despreaed data streams for each of the other mobile units, although these other sets of despreaed data streams are not shown explicitly show in FIG. 1.

For the mobile unit whose despread data streams are illustrated in FIG. 1, the receiver/demodulator 12 produces these despread sample streams at a chip rate. The chip rate is equal to 1.2288e+06 chips per second in IS-95 CDMA but is higher for the proposed 3G CDMA systems. Each of the N pairs of data streams $14_{n,I}$, $14_{n,Q}$ (n∈{A, . . . ,N}) output by the receiver/demodulator 12 is then processed by a respective one of N correlators 18A–N. Each of the correlators 18A-N attempts to determine which of a plurality (M) of orthogonal codes was actually transmitted by the given mobile unit. Considering correlator 18A in particular, it typically performs correlation of the despread in-phase and quadrature-phase sample streams $14_{A,I}$, $14_{A,Q}$ with each of the M of orthogonal codes, e.g., Walsh codes, resulting in M respective correlation levels $20_{A,1}$, $20_{A,2} \ldots 20_{A,M}$.

Similarly, the other pairs of despread sample streams produced by the receiver/demodulator 12 are carried to respective correlators which produce respective sets of M correlation levels. For completeness, FIG. 1 shows despread sample streams $14_{N,I}$ and $14_{N,Q}$ connected to the Nth correlator 18N, which produces M correlation levels $20_{N,1}$, $20_{N,2}, \ldots 20_{N,M}$, indexed with respect to the M orthogonal codes. Having regard to notation, the first subscript associated with a correlation level indicates the corresponding multipath path and ranges from A to N, while the second subscript indicates the particular Walsh code with which the despread sample streams have been correlated and ranges from 1 to M. The second subscript is sometimes referred to as an "index".

The M correlation levels output by each of the N correlators 18A–N are summed together on an index-by-index basis by M adders 22A–M. Specifically, the N correlation levels $20_{A,1} \ldots 20_{N,1}$ are fed to the first adder 22A, the N correlation levels $20_{A,2} \ldots 20_{N,2}$ are fed to the second adder 22B, and so on, until the N correlation levels $20_{A,M} \ldots 20_{N,M}$ output by the N correlators are fed to the Mth adder 22M.

Each adder 22A–M is associated with an index and serves to combine, from all of the correlators 18A–N, the correlation levels corresponding to the orthogonal code associated with the respective index. Each adder 22A–M thus outputs a respective composite correlation level 24A–M to a soft decision data generator 26. The soft decision data generator 26 can be of standard design and typically comprises a single maximum metric generator or a dual maxima metric generator and makes a soft decision as to the transmit symbols sent by a mobile unit based on the strength of the composite correlation levels 24A–M associated with that mobile unit. The soft decision data generator 26 produces a baseband sample stream 28 and feeds it to a deinterleaver 30.

The deinterleaver 30 accepts the baseband sample stream 28 and produces a deinterleaved baseband data stream 32 by performing a standard deinterleaving function on the data, e.g., filling a data symbol matrix row-wise and reading it column-wise. The deinterleaved baseband sample stream 32 is fed to a decoder 34. The decoder 34 comprises circuitry or software for correcting errors and removing other redundancies from the interleaved baseband sample stream 32, from which it produces a decoded and deinterleaved baseband bit stream 36 that is fed to a baseband digital interface 38. The decoder 34 is suitably a Viterbi decoder.

The baseband digital interface 38 contains circuitry or software for converting the decoded and deinterleaved bit baseband stream 36 into a format acceptable by the network (not shown) to which the base station is connected via line 37. The baseband digital interface 38 also comprises circuitry or software for determining the instantaneous bit rate, denoted $R^M_{INST}$, of the decoded and deinterleaved baseband bit stream 36. $R^M_{INST}$ can be measured by the baseband digital interface 38 or it may be extracted by the baseband digital interface 38 from a control message contained in the baseband bit stream 36. The baseband digital interface 38 also comprises circuitry or software for accepting network data to be transmitted to the mobile unit and supplying this data to an encoder 42 in the form of a baseband digital bit stream 40.

The encoder 42 applies error correction encoding (e.g., convolutional encoding) and repetition to the baseband digital data stream 40 received from the baseband digital interface 38 and produces an encoded baseband bit stream 44 which is fed to an interleaver 46. The interleaver 46 essentially provides functionality identical to the inverse of that provided by the deinterleaver 30 in the reverse link. The interleaver 46 may therefore comprise circuitry for receiving the encoded baseband bit stream 44 from the encoder 42, inputting it into a matrix column-wise and reading from the matrix row-wise to produce an interleaved and encoded bit stream 48 which is supplied to a multiplexer 50.

The multiplexer 50 also accepts a power control bit stream 53 from an inventive statistical power control block 54. The statistical power control block 54 is preferably a programmable entity which generates the power control bit stream 53 based on an instantaneous bit rate signal 56 received from the baseband digital interface 38, on a group of error performance parameters 57 received from a base station control processor 52 and on a signal 58 which indicates the quality of the wireless link. The statistical power control block 54 is preferably a programmable software entity and may run on the base station control processor 52.

In the preferred embodiment of the present invention, signal 58 is received from an integrator 60 and represents a measured value of the instantaneous signal-to-interference ratio, denoted $(S/I)^M_{INST}$. The integrator 60 is connected to a maximum selector 64, from which receives a maximum correlation level 62. The maximum selector 62 produces the maximum correlation level 62 as a function of the composite correlation levels 24A–M which it receives from the adders 22A–M. Both the integrator 60 and the maximum selector 64 are preferably programmable software entities and may be integrated with the statistical power control block 54. Other implementations for the maximum selector 64, integrator 60 and statistical power control block 54 include individual digital signal processors running software algorithms as well as programmable logic devices.

Depending on the value of a control signal 51 received from a base station control processor 52, the multiplexer 50 selectively punctures the interleaved and encoded bit stream 48. That is to say, the multiplexer 50 removes bits from the interleaved and encoded bit stream 48 and in their place inserts bits from the power control bit stream 53 received from the statistical power control block 54. The output of the multiplexer 50 is thus a punctured bit stream 66 which is fed to an orthogonal spreader 68. The orthogonal spreader 68 spreads the punctured bit stream 66 with an orthogonal code (e.g., Walsh code) at the chip rate in order to provide a linear combiner 72 with a spread data stream 70A. Orthogonal spreading by Walsh or other codes forms the basis of forward-link transmission in CDMA systems and is well known to those of ordinary skill in the art.

The linear combiner 72 also accepts other spread data streams 70B . . . 70L respectively associated with other mobile units. Thus, the base station will typically comprise an encoder, an interleaver, a multiplexer, a statistical power control block, an integrator, a maximum selector and an orthogonal spreader, neither of which is shown, for each of the L-1 other forward channels which can be accommodated by the base station. However, there is preferably a single, centralized control processor 52 for the base station. In IS-95 CDMA, L is usually equal to the number of mobile units with which the base station communicates, whereas in 3G CDMA, multiple forward-link channels (e.g., a fundamental traffic channel and an associated control channel) may be established for each mobile unit.

The linear combiner 72 weights the spread data streams 70A, 70B . . . 70L and combines these into a composite data stream 74 that is fed to a pseudo-random noise (PN) covering block 76. The PN covering block 76 produces in-phase and quadrature-phase data streams 78I, 78Q by multiplying the composite data stream 74 with a suitably generated pair of PN sequences. The in-phase and quadrature-phase data streams 78I, 78Q are fed to a quadrature modulator 80, which accordingly quadrature modulates a carrier to produce a quadrature modulated signal 82. Finally, the quadrature modulator 80 feeds the quadrature modulated signal 82 to a transmitter 84, which is connected to an antenna 86. The PN covering block 76, quadrature modulator 80, transmitter 84 and antenna 86 all execute functions well known by those practising the art of CDMA.

The invention lies fundamentally in the generation of the power control bit stream 53 as a function of the composite correlation levels 24A–M, the instantaneous bit rate 56 and the error performance parameters 57. In accordance with the preferred embodiment of the present invention, the correlators 18A–N generate the N sets of M correlation levels at a rate equal to the chip rate divided by M. For example, at the IS-95 chip rate of 1.2288e+06 chips/s and with the number of orthogonal codes equal to 64, this gives a new correlation level approximately once every 53 microseconds.

The adders 22A–M produce the respective composite correlation levels 24A–M at the same chip sub-rate. The maximum selector 64 then selects the largest composite correlation level 62 among the M composite correlation levels 24A–M. The integrator 60 subsequently integrates this maximum level 62 over a predetermined period of time, e.g., 1.2 ms to 10 ms. The result of this integration is the measured instantaneous signal-to-interference ratio 58, denoted $(S/I)^M_{INST}$, which is fed to the statistical power control block 54.

In accordance with the preferred embodiment of the present invention, it is suggested to define the required quality of service for a bursty traffic connection by average performance and peak outage criteria which must be met. Specifically, the error performance parameters 57 fed to the statistical power control block 54 include a target average signal-to-interference ratio, denoted $(S/I)^*_{AVG}$, and a target maximum outage time, denoted $T^*_{MAX}$. The superscript "*" indicates a parameter supplied by the control processor, which can be constant or dependent on service, system and application requirements.

Figure 2:
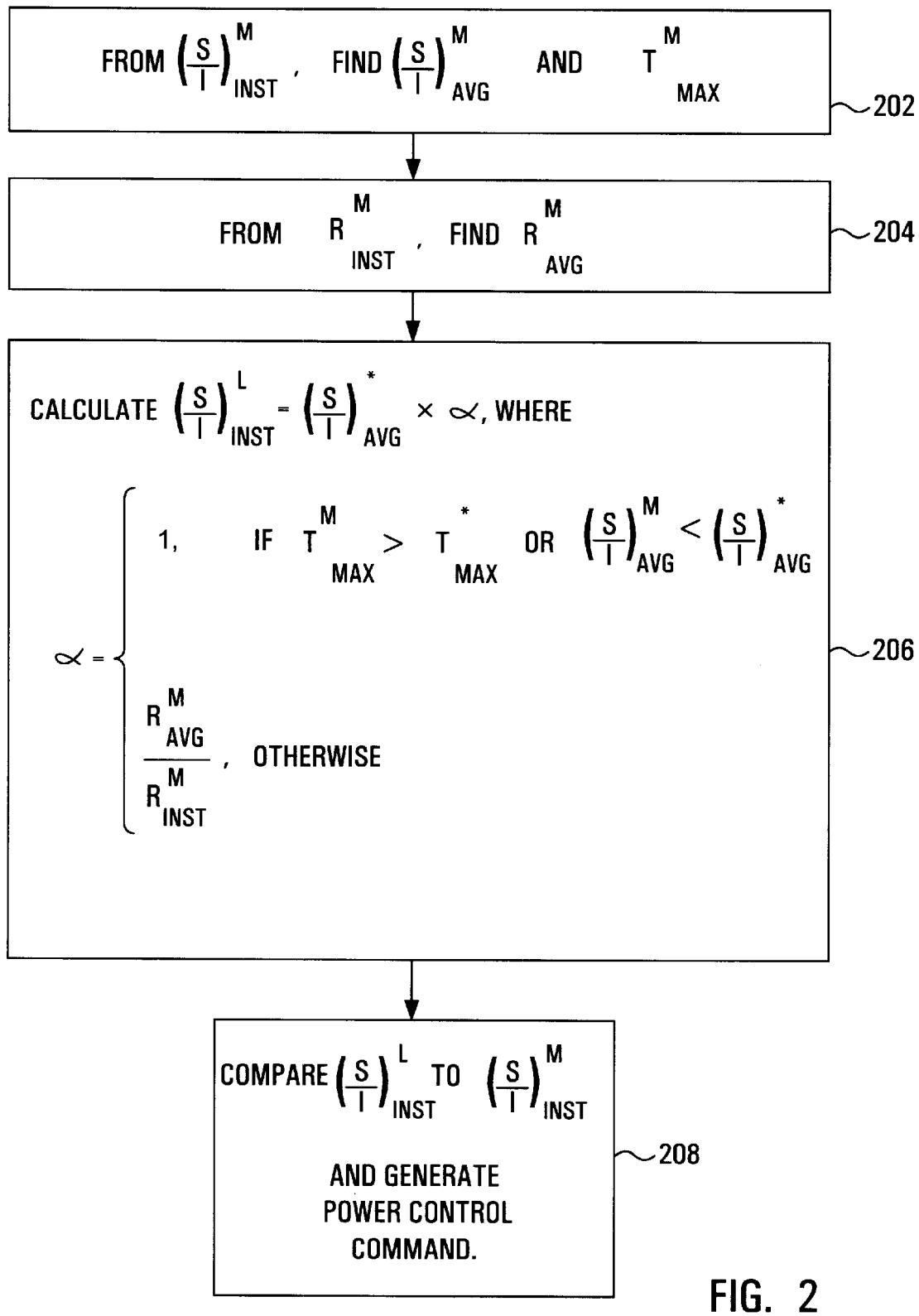
FIG. 2 is a flow chart illustrating the various steps in a power control algorithm according to the preferred embodiment of the present invention.

Based on the values of the measured instantaneous signal-to-interference ratio $(S/I)^M_{INST}$, the instantaneous bit rate $R^M_{INST}$ and the error performance parameters $(S/I)^*_{AVG}$, $T^*_{MAX}$, the statistical power control block 54 generates power control commands. FIG. 2 shows a flow chart of a preferred algorithm for generating these power control commands. The power control commands are then encoded into the power control bit stream 53 which feeds the multiplexer 50.

The entire flow chart is to be executed whenever a new power control command is required. Therefore, the rate of execution of the flow chart can be dependent on the rate at which the interleaved and encoded bit stream 40 is punctured with the power control bit stream 53 at the multiplexer 50. Alternatively, the power control commands can be sent via an associated control channel. The rate at which power control commands are generated is preferably in the neighborhood of several hundred times per second. If the measured instantaneous signal-to-interference ratio $(S/I)^M_{INST}$ is provided to the statistical power control block only every 1.2 to 10 milliseconds, a power control command may be repeated until a new value of $(S/I)^M_{INST}$ is calculated and supplied by the integrator 60.

Therefore, with reference to FIG. 2, at step 202, the statistical power control block 54 determines an average value, denoted $(S/I)^M_{AVG}$, of the measured instantaneous signal-to-interference ratio $(S/I)^M_{INST}$ by saving the latter in an array and integrating this array over a time constant of considerable duration, e.g., 5 seconds. Naturally, the integrator 60 may have a greater or smaller time constant. If the integrator 60 outputs a value for the measured instantaneous signal-to-interference ratio $(S/I)^M_{INST}$ every X milliseconds, then the statistical power control block 54 simply averages the 5000/X most recent values. Preferably, a moving average value $(S/I)^M_{AVG}$ is produced at intervals of between 1.2 ms and 10 ms.

The statistical power control block 54 also determines a maximum outage time, denoted $T^M_{MAX}$, which is defined as the longest consecutive time span over the most recent past during which the measured signal-to-interference ratio $(S/I)^M_{INST}$ is below the target average signal-to-interference ratio $(S/I)^*_{AVG}$. The most recent past used to measure the maximum outage time $T^M_{MAX}$ is preferably shorter than the time window used.in the calculation of $(S/I)^M_{AVG}$.

At step 204, an average bit rate $R^M_{AVG}$ is found by integrating the instantaneous bit rate $R^M_{INST}$ received from the baseband digital interface 38 over a substantially long time window, for instance 5 seconds. If the instantaneous bit rate $R^M_{INST}$ is supplied by the baseband digital interface 38 every X milliseconds, then this would mean producing a value of $R^M_{AVG}$ based on the 5000/X most recent measurements of the instantaneous bit rate $R^M_{INST}$. Of course, it is within the scope of the invention to provide a shorter or longer time window.

At step 206, the statistical power control block 54 sets a threshold instantaneous signal-to-interference ratio, denoted $(S/I)^L_{INST}$, as follows:

$$\left(\frac{S}{I}\right)^L_{INST} = \left(\frac{S}{I}\right)^*_{AVG} \cdot \alpha, \text{ where}$$

$$\alpha = \begin{cases} 1, & \text{if } T^M_{MAX} > T^*_{MAX} \text{ or } \left(\frac{S}{I}\right)^M_{AVG} < \left(\frac{S}{I}\right)^*_{AVG} \\ \frac{R^M_{AVG}}{R^M_{INST}}, & \text{otherwise.} \end{cases}$$

It is recalled that the target average signal-to-interference ratio $(S/I)^*_{AVG}$ has a superscript "*" since it is an error performance parameter 57 supplied by the base station control processor 52. However, the threshold instantaneous signal-to-interference ratio $(S/I)^L_{INST}$ is not only a function of $(S/I)^*_{AVG}$ but also of a factor $\alpha$.

From the above equation, it is clear that if the average signal-to-interference and maximum outage constraints are met, i.e., if $(S/I)^M_{AVG} > (S/I)^*_{AVG}$ and $T^M_{MAX} < T^*_{MAX}$, then the threshold instantaneous signal-to-interference ratio $(S/I)^L_{INST}$ will be a function of the ratio of the average to instantaneous bit rate. However, if the error performance targets are not met, then the target instantaneous signal-to-interference ratio will be set to the average signal-to-interference ratio until the error performance targets eventually do become met.

It is observed that a comparison of the measured and target average signal-to-interference ratios practically eliminates the impact of bit rate variations on the mobile unit transmit power level, while a comparison of the measured and target maximum outage times ensures an acceptable outage probability since it is proportional to the time that a mobile continuously stays in outage state. This results in a power control scheme that is better suited to bursty traffic than existing power control schemes.

At step 208, the measured instantaneous signal-to-interference ratio $(S/I)^M_{INST}$ is compared to the just calculated threshold instantaneous signal-to-interference ratio $(S/I)^L_{INST}$. Preferably, the comparison effected is a difference and the result of the difference determines the value of the power control bit stream 53. That is to say, if the measured value is greater than the target value, then a "zero" could be inserted into the power control bit stream 53, while if the measured value is less than the target value, then the mobile unit transmitted power must be increased, and to this end a "one" could be inserted into the power control bit stream 53. Alternatively, a multi-bit power control command could be generated and could have a value that depends on a function of $(S/I)^L_{INST}$ and $(S/I)^M_{INST}$. Functions other than the difference could be applied, e.g., it may be appropriate in some circumstances to determine the quotient of $(S/I)^L_{INST}$ and $(S/I)^M_{INST}$ or the logarithm thereof.

The power control bit stream 53 generated in accordance with the above-described method can then be multiplexed with the interleaved and encoded bit stream 48 by the multiplexer 50. This results in the creation of a power control subchannel that is delivered to, and decoded by, the destination mobile unit in a known way. Alternatively, as has been proposed for use in 3G CDMA systems, the power control bit stream 53 may be transmitted to the destination mobile unit along with other control information using a so-called associated control channel. The associated control channel can be transmitted, detected and decoded in any suitable manner known to those skilled in the art.

Upon receipt and decoding of the power control bit stream 53, the destination mobile unit accordingly adjusts its transmit power in a way known to ordinarily skilled CDMA systems engineers.

As a result of implementing the outer-loop power control mechanism in accordance with the preferred embodiment of the present invention, the threshold instantaneous signal-to-interference ratio $(S/I)^L_{INST}$ will be reduced relative to the target average signal-to-interference ratio $(S/I)^*_{AVG}$ if the error targets have been met and if the current bit rate is higher than its average value. Similarly, the threshold instantaneous signal-to-interference ratio $(S/I)^L_{INST}$ will be increased relative to the target average signal-to-interference ratio $(S/I)^*_{AVG}$ if the error targets have been met and if the current bit rate is lower than its average value.

In this way, a sudden burst of data actually results in a lowering of the threshold instantaneous signal-to-interference ratio $(S/I)^L_{INST}$, until such time that the average signal-to-interference ratio or the maximum outage time are no longer acceptable. The power control commands generated in this interim period will therefore not tell the mobile unit to abruptly increase its transmit power. This provides a smoothing effect of the interference induced to other users and there may result an increase in cell capacity.

Similarly, if the data rate is reduced while the limitations on the average error performance and outage times are being respected, then the average bit rate will be higher than the instantaneous bit rate, which increases the threshold instantaneous signal-to-interference ratio, which further maintains the mobile unit's transmitted power at a relatively high power level for a longer time interval, followed by a gradual reduction as the average bit rate drops with time.

It is also noted that existing hardware in a CDMA base station need not be changed in order to practice the invention. In fact, the statistical power control block 54 may be installed as a software upgrade of the control processor and may be provided to end users of the software in the form of a disk, tape or other computer-readable medium. The software may also be downloaded from a remote location, e.g., a central controller.

While the preferred embodiment of the present invention has been described and illustrated, it will be apparent to those skilled in the art that numerous variations and modifications can be made. For example, any suitable arrangement of functional blocks which provide a measured value of the instantaneous signal-to-interference ratio $(S/I)^M_{INST}$ may be used instead of the maximum selector 64 and the integrator 60.

In fact, the maximum selector 64 and the integrator 60 can be dispensed with entirely if a measured short-term average frame error rate $FER^M_{INST}$, a measured long-term average frame error rate $FER^M_{AVG}$ and a measured maximum outage time $T^M_{MAX}$ are determined directly by the decoder 34 or the baseband digital interface 38 and provided at regular intervals to the statistical power control block 54. In this case, the error performance parameters 57 would include a target long-term average frame error rate $FER^*_{AVG}$ along with the target maximum outage time $T^*_{MAX}$. Again, the superscript "*" denotes a parameter supplied by the control processor 52. The measured maximum outage time $T^M_{MAX}$ can be defined as the duration of the longest consecutive interval over the most recent past during which the measured short-term average frame error rate $FER^M_{INST}$ has remained below the target long-term average frame error rate $FER^*_{AVG}$.

Figure 3:
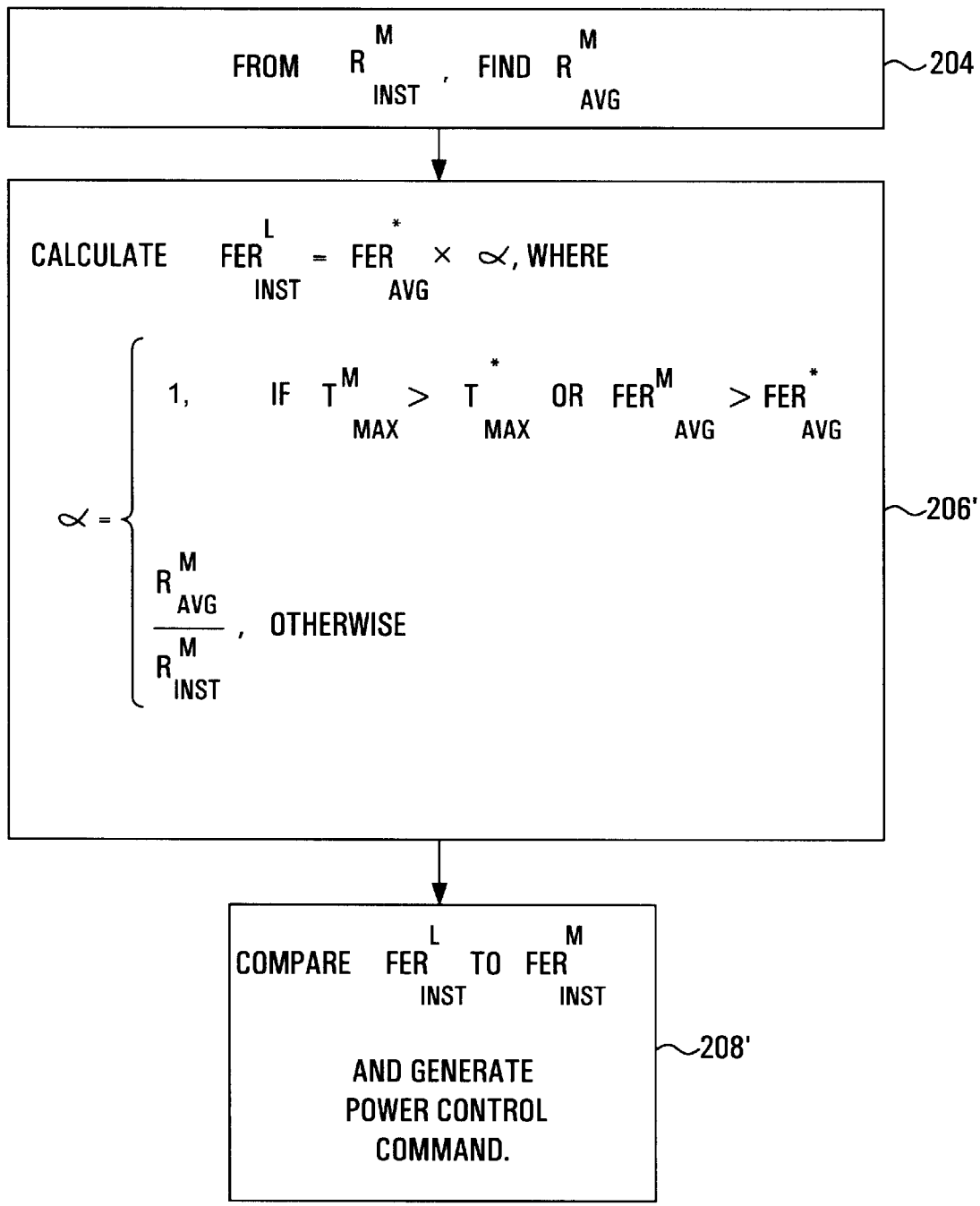
FIG. 3 is a flow chart illustrating the various steps in a power control algorithm according to an alternate embodiment of the present invention.

With reference to FIG. 3, step 204 performs the same function as it did in FIG. 2, namely, the instantaneous bit rate $R^M_{INST}$ is averaged over a time window of, e.g., 5 seconds and a moving average value of the measured bit rate is provided as the average bit rate $R^M_{AVG}$.

Steps 206' and 208' of FIG. 3 replace steps 206 and 208 of FIG. 2, respectively. At step 206', a threshold short-term average frame error rate $FER^L_{INST}$ is set equal to the target long-term average frame error rate $FER^*_{AVG}$ if at least one of the error performance criteria (based on the target long-term average frame error rate and the target maximum outage time) is not met. However, it the error performance criteria are met then the threshold short-term error rate $FER^L_{INST}$ is set to the target long-term average error rate $FER^*_{AVG}$ times the ratio of the average bit rate $R^M_{AVG}$ to the instantaneous bit rate $R^M_{INST}$.

In box 208', the measured short-term average frame error rate $FER^M_{INST}$ is then compared to the threshold short-term frame error rate $FER^L_{INST}$ found at step 206' and a power control command is generated based on the difference therebetween. Alternatively, other functions of $FER^M_{INST}$ and $FER^L_{INST}$ can be used to compute the power control command.

It should be appreciated that the invention is also applicable to controlling base station transmit power, particularly in systems which adhere (or will adhere) to the various 3G standards proposals which allow for closed-loop power control in the forward-link direction. Therefore, it is to be understood that the statistical power control block 54 can be used in a mobile unit in much the same way as it is in a base station in order to generate power control commands for transmission to the base station. The only differences with respect to FIGS. 1, 2 and 3 lie in the type of spreading applied by the mobile unit in the reverse-link direction and in the functionality provided by the baseband digital interface 38. These differences would be well understood by ordinary CDMA systems engineers and do not affect the advantages gained by the outer-loop power control mechanism of the present invention.

In view of the many further variations of the present invention which may be conceived by persons skilled in the art, the scope of the invention is only to be limited by the claims appended hereto.

We claim:

1. A method of generating power control commands for transmission to a source unit communicating with a destination unit, the method comprising, at the destination unit:
   (a) measuring an instantaneous performance parameter of signals received from the source unit;
   (b) determining an instantaneous bit rate, denoted $R^M_{INST}$, of the signals received from the source unit;
   (c) computing a threshold instantaneous performance parameter as a first function of the measured instantaneous performance parameter, of $R^M_{INST}$, and of at least one target error performance parameter; and
   (d) generating a power control command based upon a second function of the measured instantaneous performance parameter and the threshold instantaneous performance parameter.

2. A method as claimed in claim 1, wherein said second function is the difference between the measured instantaneous performance parameter and the threshold instantaneous performance parameter.

3. A method as claimed in claim 1, wherein the measured instantaneous performance parameter is a measured instantaneous signal-to-interference ratio, denoted $(S/I)^M_{INST}$, and wherein the threshold instantaneous performance parameter is a threshold instantaneous signal-to-interference ratio, denoted $(S/I)^L_{INST}$.

4. A method as claimed in claim 3, wherein two of the target error performance parameters are a target average signal-to-interference ratio, denoted $(S/I)^*_{AVG}$, and a target maximum outage time, denoted $T^*_{MAX}$, and wherein step (c) comprises:

(c1) integrating $(S/I)^M_{INST}$ over a first time window to compute a measured average signal-to-interference ratio, denoted $(S/I)^M_{AVG}$;

(c2) integrating $R^M_{INST}$ over a second time window to compute an average bit rate, denoted $R^M_{AVG}$; and (c3) among a plurality of most recent values of $(S/I)^M_{INST}$, determining the longest amount of time during which $(S/I)^M_{INST}$ was below $(S/I)^*_{AVG}$, said longest amount of time being denoted $T^M_{MAX}$;

wherein said first function is:

$$\left(\frac{S}{I}\right)^L_{INST} = \left(\frac{S}{I}\right)^*_{AVG} \cdot \alpha, \text{ where}$$

$$\alpha = \begin{cases} 1, & \text{if } T^M_{MAX} > T^*_{MAX} \text{ or } \left(\frac{S}{I}\right)^M_{AVG} < \left(\frac{S}{I}\right)^*_{AVG} \\ \dfrac{R^M_{AVG}}{R^M_{INST}}, & \text{otherwise.} \end{cases}$$

5. A method as claimed in claim 4, wherein the length of time spanned by said plurality of most recent values of $(S/I)^M_{INST}$ is shorter than the first time window.

6. A method as claimed in claim 1, wherein the measured instantaneous performance parameter is a measured short-term frame error rate, denoted $FER^M_{INST}$, and wherein the threshold instantaneous performance parameter is a threshold short-term frame error rate, denoted $FER^L_{INST}$.

7. A method as claimed in claim 6, wherein two of the target error performance parameters are a target long-term average frame error rate, denoted $FER^*_{AVG}$, and a target maximum outage time, denoted $T^*_{MAX}$, and wherein step (c) comprises:

(c1) integrating $FER^M_{INST}$ over a first time window to compute a measured average signal-to-interference ratio, denoted $FER^M_{AVG}$;

(c2) integrating $R^M_{INST}$ over a second time window to compute an average bit rate, denoted $R^M_{AVG}$; and (c3) among a plurality of most recent values of $FER^M_{INST}$, determining the longest amount of time during which $FER^M_{INST}$ was below $FER^*_{AVG}$, said longest amount of time being denoted $T^M_{MAX}$;

wherein said first function is:

$$FER_{INST}^L = FER_{AVG}^* \cdot \alpha,$$

where $$\alpha = \begin{cases} 1, & \text{if } T^M_{MAX} > T^*_{MAX} \text{ or } FER^M_{AVG} > FER^*_{AVG} \\ \dfrac{R^M_{AVG}}{R^M_{INST}}, & \text{otherwise.} \end{cases} \quad 5$$

8. A method as claimed in claim 7, wherein the length of time spanned by said plurality of most recent values of $FER^M_{INST}$ is shorter than the first time window.

9. A method as claimed in claim 1, further comprising transmitting the power control commands to the source unit.

10. A method as claimed in claim 9, wherein transmitting the power control commands comprises:
   puncturing a data stream destined for the destination; and
   inserting said power control commands into the punctured data stream.

11. A method as claimed in claim 9, wherein transmitting the power control commands comprises sending the power control commands along an associated control channel in parallel with a data stream destined for the destination.

12. A method as claimed in claim 1, wherein the source unit is a mobile unit and the destination unit is a base station.

13. A method as claimed in claim 1, wherein the source unit is a base station and the destination unit is a mobile unit.

14. A computer-readable storage medium which, when processed by a computer at a destination unit, executes a sequence of steps to generate a power control command for transmission to a source unit communicating with the destination unit, the steps comprising:
   (a) computing a threshold instantaneous performance parameter as a first function of a measured instantaneous performance parameter, a measured instantaneous bit rate and at least one target error performance parameter; and
   (b) generating a power control command based upon a second function of the measured instantaneous performance parameter and the threshold instantaneous performance parameter.

15. A computer-readable storage medium as claimed in claim 14, said medium being stored in a control processor at a base station.

16. A computer-readable storage medium as claimed in claim 14, said medium being stored in a control processor at a mobile unit.

17. A computer-readable storage medium as claimed in claim 14, operable further to execute steps comprising:
   (a) detecting a start and an end of a data burst associated with a received signal; and
   (b) configuring said power control command to provide for an increase in the measured instantaneous performance parameter when the data burst is detected and decreasing the measured instantaneous performance parameter when an end of the data burst is detected.

18. A statistical power control block for use in a destination unit communicating with at least one source unit, comprising:
   means for computing a threshold instantaneous performance parameter as a first function of a measured instantaneous performance parameter, a measured instantaneous bit rate and at least one target error performance parameter; and
   means connected to the computing means, for generating a power control command based upon a second function of the measured instantaneous performance parameter and the threshold instantaneous performance parameter.

19. A functional unit for generating power control commands, comprising:
   a maximum selector for receiving a plurality of composite correlation levels and selecting the largest thereamong;
   an integrator connected to the maximum selector, for receiving the largest composite correlation level and integrating it over a predetermined length of time, thereby to produce a measured instantaneous performance parameter at regular intervals;
   a statistical power control block connected to the integrator and being operable to compute a threshold instantaneous performance parameter as a first function of the measured instantaneous performance parameter, a measured instantaneous bit rate and at least one target error performance parameter; and to generate a power control command based upon a second function of the measured instantaneous performance parameter and the threshold instantaneous performance parameter.

* * * * *